Patented Feb. 20, 1923.

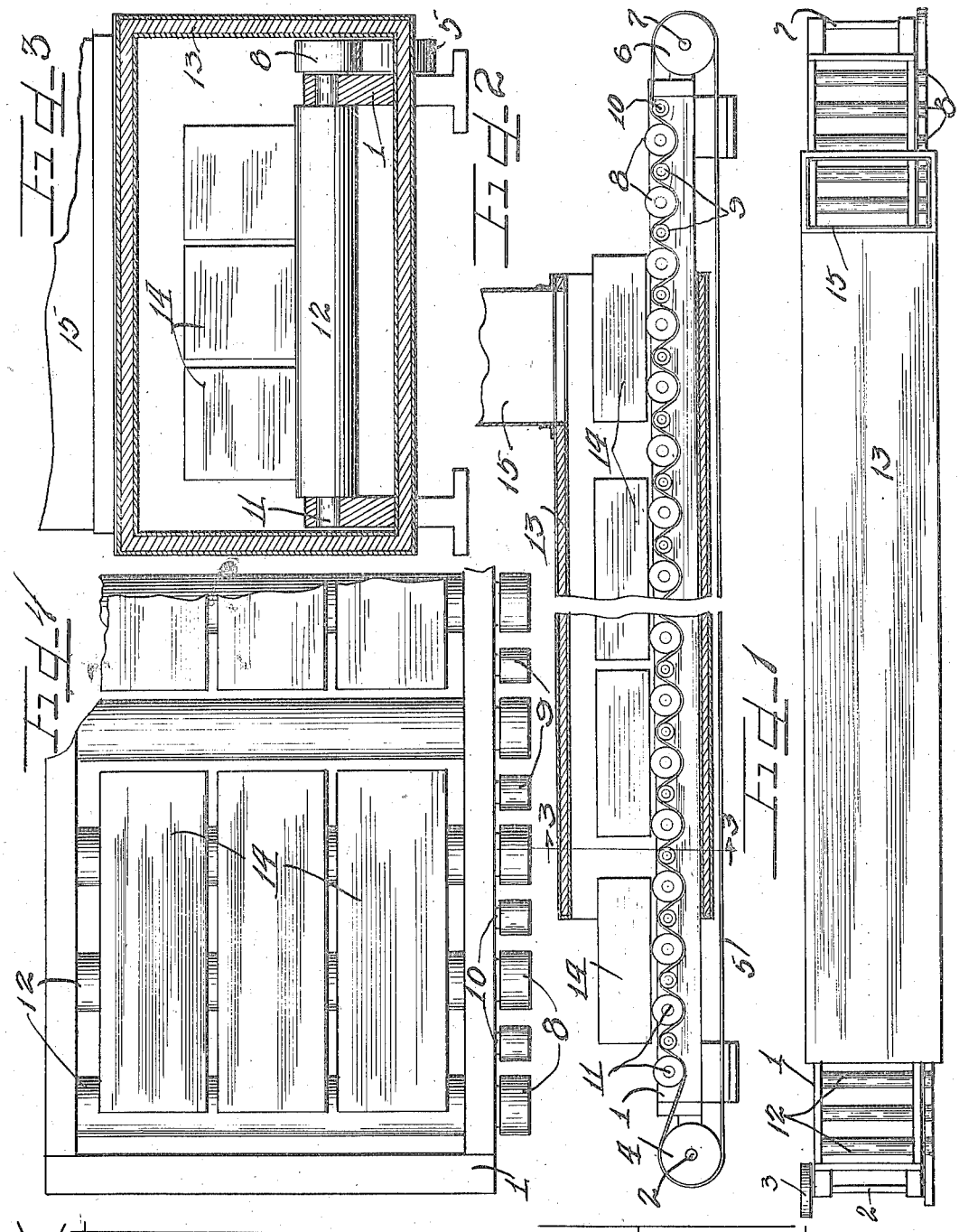

1,445,785

UNITED STATES PATENT OFFICE.

JULIUS R. MEYERS, OF GLENCOE, ILLINOIS.

CHEESE-DRYING PROCESS.

Application filed March 7, 1921. Serial No. 450,299.

*To all whom it may concern:*

Be it known that I, JULIUS R. MEYERS, a citizen of the United States, and a resident of the city of Glencoe, in the county of Cook and State of Illinois, have invented certain new and useful Improvements in a Cheese-Drying Process; and I do hereby declare that the following is a full, clear, and exact description of the same, reference being had to the accompanying drawings, and to the numerals of reference marked thereon, which form a part of this specification.

In the manufacture of cheese after green cheeses have been cut up into small pieces and pressed in small individual molds to produce small cheeses of predetermined size having smooth outer surfaces free from holes and irregularities, it has been found that moisture from the interior of the small cheeses accumulates on the exterior surfaces of the cheeses. It therefore requires considerable time and space to permit the small cheeses to dry.

This invention, therefore, relates to a process whereby small cheeses are adapted to have the outer surfaces thereof properly dried by passing the same through a casing having a current of hot air flowing therethrough in a direction opposite to the movement of the cheeses through the casing.

It is an object of this invention to provide a process whereby formed individual cheeses may be dried in a comparatively short time.

Another object of the invention is to provide a cheese drying process wherein individual cheeses are conducted through a current of heated air over a roller table.

It is a further object of this invention to provide a cheese drying process wherein the moisture accumulating on the surfaces of formed cheeses is adapted to be readily evaporated by conveying the cheese by means of a roller table through a casing against a current of hot air.

It is an important object of this invention to provide a cheese drying process of simple and effective form wherein all the surfaces of cheeses may be dried by subjecting the cheeses to a current of hot dry air as the cheeses are conducted through a casing over a roller mechanism.

Other and further important objects of this invention will be apparent from the disclosures in the specification and drawings.

The invention (in a preferred form) is illustrated in the drawings and hereinafter more fully described.

On the drawings:

Figure 1 is a top plan view of a cheese drying machine by which the process of this invention is accomplished.

Figure 2 is a vertical elevation thereof partly broken away and showing the casing in section.

Figure 3 is an enlarged cross section taken on line 3—3 of Figure 2.

Figure 4 is an enlarged fragmentary top plan view of one end of the roller table.

As shown on the drawings:

The drying machine comprises a frame 1 having rotatably supported at one end thereof a driving shaft 2 on one end of which a driving wheel 3 is secured to be driven by a belt from any suitable source of power. A wheel 4 is secured on the opposite end of the driving shaft 2 and has trained thereover an endless belt 5. The belt 5 is also engaged around a wheel 6 supported on one end of a shaft 7 mounted transversely of the discharge end of the machine. The upper flight of the belt 5 is alternately conducted under large wheels 8 and small idler wheels 9. The small idler wheels 9 are supported on pins or stub shafts 10, which are supported in one of the sills of the frame 1. The larger wheels 8 are secured on the projecting ends of a plurality of parallel shafts or axles 11, which are journalled transversely of the machine in the frame sills. Secured on each of the shafts 11 between the frame sills is a roller 12 which projects above the frame 1. The rollers 12 are adapted to be rotated by the wheels 8 and the belt 5.

The roller table consisting of the frame 1 and the rollers 12 extends through a long insulated casing 13 opening at both ends to permit cheeses 14 to be dried, to be conducted through the casing 13 over the rotating rollers 12. A flue or pipe 15 is mounted on the top of the outlet end of the casing 13 to permit a current of hot dry air to be forced forwardly through the casing 13, in a direction opposite to the path of the cheeses through the machine. The pipe 15 is adapted to be connected with any suitable source of hot air supply. To cause the hot air to flow through the casing 13 in the direction desired, a suction or a blow motor may be connected with said casing.

The process covering this invention consists in artificially drying the surfaces of small finished cheeses of predetermined size by placing the cheeses on the rollers 12, which when rotated by the belt 5 cause the cheeses to be conducted through the casing 13 in a direction opposite to that of a current of dry hot air which is forced from the pipe 15 through said casing. By providing a roller table to feed the cheeses through the casing, an arrangement is afforded whereby the bottom surfaces of the cheeses are subjected to the action of the hot air and are therefore adapted to be dried simultaneously with the other surfaces of the cheeses. The dried cheeses upon leaving the discharge end of the drying oven or casing 13 are removed from the roller table and subsequently passed through hot paraffin wax, after which they are boxed.

In connection with this invention, attention is directed to my copending application for patent for a "Process for forming cheese", Serial No. 431,458, filed December 17th, 1920, in which a large green cheese is cut into a plurality of pieces which are pressed in small individual molds which when filled are subjected to heat for a short period to expand the cheese therein to fill out the surface irregularities to form a small cheese of predetermined size having smooth even surfaces. It will thus be seen that the small cheeses formed as above described may be dried by passing the same through a current of dry hot air, thus affording a continuous process for the manufacture of small cheeses.

It is thus evident that this invention eliminates the ordinary drying room and affords a process whereby the cheese may be paraffined within a short time after being taken from the mold.

I am aware that numerous details of construction may be varied through a wide range without departing from the principles of this invention, and I therefore do not purpose limiting the patent granted otherwise than necessitated by the prior art.

I claim as my invention:

1. The process of drying the surfaces of cheeses by conducting the cheeses through a current of dry hot air over spaced rotatable rollers.

2. The process of drying the moisture from the surfaces of small finished cheeses by subjecting all of the surfaces of the cheeses to dry hot air as they are advanced through a housing by means of rotatable members.

3. The process of drying the moisture from the surfaces of small finished cheeses by placing the cheeses on a roller table which acts to feed the cheeses through a heated casing.

4. The process of drying the moisture from the surfaces of small finished cheeses by conveying the cheeses through a casing on members having a changing contact therewith as said cheeses are conveyed in a direction opposite to that of a current of dry hot air passing through said casing.

5. The process of drying cheeses by conveying the same through a current of hot air by means of rotatable spaced rollers to permit the surfaces of the cheeses contacting the rollers to be dried simultaneously with the other surfaces of the cheeses.

6. The process of drying cheeses comprising conducting the cheeses through a confined heated space by means of members which act to transfer the cheeses from one of said members to the other to permit all of the surfaces of said cheeses to be simultaneously and evenly dried.

In testimony whereof I have hereunto subscribed my name in the presence of two subscribing witnesses.

JULIUS R. MEYERS.

Witnesses:
CARLTON HILL,
FRED E. PAESLER.